US009375862B2

(12) United States Patent
Yoshida et al.

(10) Patent No.: US 9,375,862 B2
(45) Date of Patent: Jun. 28, 2016

(54) MANUFACTURING METHOD OF HONEYCOMB STRUCTURE

(75) Inventors: Shinya Yoshida, Nagoya (JP); Shuhei Fujita, Nagoya (JP); Toru Ogawa, Yokkaichi (JP)

(73) Assignee: NGK Insulators, Ltd., Nagoya (JP)

( * ) Notice: Subject to any disclaimer, the term of this patent is extended or adjusted under 35 U.S.C. 154(b) by 630 days.

(21) Appl. No.: 13/588,203

(22) Filed: Aug. 17, 2012

(65) Prior Publication Data

US 2013/0049268 A1 Feb. 28, 2013

(30) Foreign Application Priority Data

Aug. 23, 2011 (JP) ................................ 2011-181043
Aug. 16, 2012 (JP) ................................ 2012-180573

(51) Int. Cl.
*C04B 35/64* (2006.01)
*B28B 19/00* (2006.01)

(52) U.S. Cl.
CPC ................................ *B28B 19/0038* (2013.01)

(58) Field of Classification Search
CPC ................................................ C04B 38/0006
USPC ........................................ 264/618, 630, 631
See application file for complete search history.

(56) References Cited

U.S. PATENT DOCUMENTS 4,293,513 A 10/1981 Langley et al.
5,063,029 A 11/1991 Mizuno et al.
5,288,975 A 2/1994 Kondo
5,916,467 A 6/1999 Shimada
5,964,991 A 10/1999 Kawasaki et al.
6,183,609 B1 2/2001 Kawasaki et al.
7,011,803 B2 3/2006 Ichikawa et al.

(Continued)

FOREIGN PATENT DOCUMENTS

JP 58-206818 A1 12/1983
JP 08-141408 A1 6/1996

(Continued)

OTHER PUBLICATIONS

Micro-tec. "Practice of Screen Printing". (screen capture dated Jul. 1, 2009 of http://www.e-microtec.co.jp/tech/practiceE.html). [online] [retrieved Jul. 14, 2015]. Retrieved from: Internet Archive WayBack Machine using Internet <URL: https://web.archcive.org/web/20090701045734/http://www.e-microtec.co.jp/tech/practiceE.html>.*

(Continued)

*Primary Examiner* — Erin Snelting
(74) *Attorney, Agent, or Firm* — Burr & Brown, PLLC

(57) ABSTRACT

The manufacturing method of the honeycomb structure includes a forming step of a honeycomb formed body with non-fired electrodes where there is performed twice a non-fired electrode forming operation in which an electrode paste is attached to a plate including a printing screen, a side surface of a honeycomb formed body, the side surface being a curved side surface, is brought into a pressed state by a squeegee via the printing screen of the plate, in the state, the body is rotated and the plate is linearly moved along the side surface of the body, and the squeegee allows the electrode paste to permeate the printing screen and coat the side surface of the body; and a forming step of the honeycomb structure where the body with the non-fired electrodes is fired to obtain the honeycomb structure.

4 Claims, 11 Drawing Sheets

(56) References Cited

U.S. PATENT DOCUMENTS

| | | | | |
|---|---|---|---|---|
| 2003/0134084 | A1 | 7/2003 | Ichikawa et al. | |
| 2007/0262679 | A1 | 11/2007 | Maruyama et al. | |
| 2008/0179781 | A1 * | 7/2008 | Iwata | 264/177.12 |
| 2009/0199381 | A1 | 8/2009 | Maruyama et al. | |
| 2012/0187109 | A1 | 7/2012 | Noguchi et al. | |

FOREIGN PATENT DOCUMENTS

| | | | |
|---|---|---|---|
| JP | 10-199549 | A1 | 7/1998 |
| JP | 2931362 | B2 | 8/1999 |
| JP | 2007-306775 | A1 | 11/2007 |
| JP | 4136319 | B2 | 8/2008 |
| WO | 2011/043434 | A1 | 4/2011 |

OTHER PUBLICATIONS

Extended European Search Report (Application No. 12180926.3) dated May 26, 2014.

Japanese Office Action (Application No. 2012-180573) dated Apr. 26, 2016 (with English translation).

* cited by examiner

MANUFACTURING METHOD OF HONEYCOMB STRUCTURE

BACKGROUND OF THE INVENTION

1. Field of the Invention

The present invention relates to a manufacturing method of a honeycomb structure. More particularly, it relates to the manufacturing method of the honeycomb structure which is capable of efficiently forming electrodes each having a uniform thickness on a side surface of the columnar honeycomb structure, the side surface being a curved surface.

2. Description of Related Art

Heretofore, a ceramic honeycomb structure on which a catalyst is loaded has been used for treating harmful substances in an exhaust gas discharged from a car engine. Specifically, for example, it is also known that the honeycomb structure formed by a sintered body of silicon carbide is used in the purification of the exhaust gas (e.g., see Patent Document 1).

When the exhaust gas is treated by the catalyst loaded on the honeycomb structure, it is necessary to raise a temperature of the catalyst to a predetermined temperature, but at the start of the engine, a catalyst temperature is low, and hence there has been the problem that the exhaust gas is not sufficiently purified.

To solve the problem, there has been investigated a method of disposing a heater made of a metal on an upstream side of the honeycomb structure on which the catalyst is loaded, to raise the temperature of the exhaust gas (e.g., see Patent Document 2).

Moreover, it is disclosed that a honeycomb structure provided with electrodes at both ends thereof and made of a conductive ceramic is used as a catalyst carrier with a heater (e.g., see Patent Document 3). Furthermore, there is disclosed a ceramic honeycomb structure provided with electrodes on a side surface thereof, to generate heat by energization (e.g., see Patent Document 4).

[Patent Document 1] JP-B-4136319

[Patent Document 2] JP-B-2931362

[Patent Document 3] JP-A-H08-141408

[Patent Document 4] WO2011/043434

SUMMARY OF THE INVENTION

When the above ceramic honeycomb structure (the catalyst carrier) provided with electrodes on a side surface thereof, to generate heat by energization" (e.g., see Patent Document 4) is prepared and the honeycomb structure has a cylindrical shape, it is necessary to form the electrodes on the side surface of the honeycomb structure having the cylindrical shape.

However, heretofore, it has not necessarily been easy to form the electrodes each having a uniform thickness on the side surface of such a honeycomb structure having the cylindrical shape.

The present invention has been developed in view of the above-mentioned problem, and an object thereof is to provide a manufacturing method of a honeycomb structure which is capable of efficiently forming electrodes each having a uniform thickness on a side surface of the columnar honeycomb structure, the side surface being a curved surface.

To solve the above problem, according to the present invention, there is provided the following manufacturing method of a honeycomb structure.

[1] A manufacturing method of a honeycomb structure comprising: a forming step of a honeycomb formed body with non-fired electrodes where there is performed twice a non-fired electrode forming operation in which an electrode paste is attached to a plate including a printing screen, a side surface of a columnar ceramic honeycomb formed body, the side surface being a curved side surface, is brought into a pressed state by a squeegee via the printing screen of the plate, the ceramic honeycomb formed body including: partition walls to divide and form a plurality of cells which extend from one end surface to the other end surface and become through channels of a fluid; and an outer peripheral wall positioned in the outermost periphery of the body, in the state, the ceramic honeycomb formed body is rotated around a central axis and the plate is linearly moved along the side surface of the ceramic honeycomb formed body synchronously with the rotation of the ceramic honeycomb formed body, and the squeegee allows the electrode paste attached to the plate to permeate the printing screen and coat the side surface of the ceramic honeycomb formed body, to form the pair of non-fired electrodes on the side surface of the ceramic honeycomb formed body, thereby preparing the honeycomb formed body with the non-fired electrodes; and a forming step of the honeycomb structure where the honeycomb formed body with the non-fired electrodes is fired, to obtain the honeycomb structure including the pair of electrodes on the side surface thereof.

[2] The manufacturing method of the honeycomb structure according to [1], wherein a thickness of the printing screen of the plate is from 22 to 300 μm.

[3] The manufacturing method of the honeycomb structure according to [1] or [2], wherein a hardness of the squeegee is from 30 to 90 degrees.

[4] The manufacturing method of the honeycomb structure according to any one of [1] to [3], wherein a pressure when pressing the ceramic honeycomb formed body by the squeegee is from 0.05 to 0.4 MPa.

[5] The manufacturing method of the honeycomb structure according to any one of [1] to [4], wherein in the forming step of the honeycomb formed body with the non-fired electrodes, the honeycomb formed body with the non-fired electrodes is prepared so that in a cross section of the honeycomb formed body with the non-fired electrodes which is orthogonal to a cell extending direction, a direction in which centers of the non-fired electrodes in an outer peripheral direction of the ceramic honeycomb formed body are connected to each other matches a direction in which part of the partition walls extend, in a range of ±15°.

In a manufacturing method of a honeycomb structure of the present invention, a non-fired electrode forming operation is performed twice to form a pair of non-fired electrodes on a side surface of the ceramic honeycomb formed body, thereby preparing the honeycomb formed body with the non-fired electrodes. Moreover, in the non-fired electrode forming operation, first, an electrode paste is attached to a plate including a printing screen. Then, a side surface of a columnar ceramic honeycomb formed body, the side surface being a curved surface, is brought into a pressed state by a squeegee via the printing screen of the plate. Then, in the state, the ceramic honeycomb formed body is rotated around a central axis and the plate is linearly moved along the side surface of the ceramic honeycomb formed body synchronously with the rotation of the ceramic honeycomb formed body. Then, the squeegee allows the electrode paste attached to the plate to permeate the printing screen and coat the side surface of the ceramic honeycomb formed body. Consequently, a thickness of each of the non-fired electrodes is determined by a thickness of the printing screen of the plate, and the whole thickness of each non-fired electrode can be made uniform. Thus, the thickness of each of a pair of electrodes of the obtained honeycomb structure can be made uniform. Furthermore, since the side surface of the ceramic honeycomb formed body having a cylindrical shape is directly coated with the electrode paste to form the non-fired electrodes thereon, the electrodes can efficiently be formed.

DETAILED DESCRIPTION OF THE INVENTION

Hereinafter, a mode for carrying out the present invention will be described in detail with reference to the drawings. It should be understood that the present invention is not limited to the following embodiments and that modifications, improvements and the like of design are suitably added to the present invention on the basis of the ordinary knowledge of a person skilled in the art without departing from the scope of the present invention.

(1) Manufacturing Method of Honeycomb Structure:

(1-1) Forming Step of Honeycomb Formed Body with Non-Fired Electrodes

Figure 1:
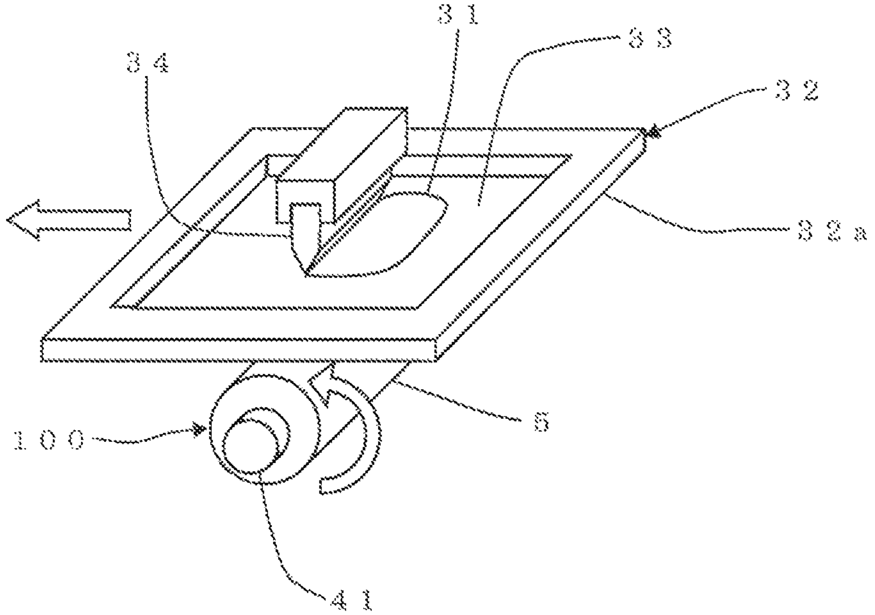
FIG. 1 is a perspective view schematically showing that a ceramic honeycomb formed body is coated with an electrode paste in a forming step of a honeycomb formed body with non-fired electrodes in an embodiment of a manufacturing method of a honeycomb structure according to the present invention.
Figure 2:
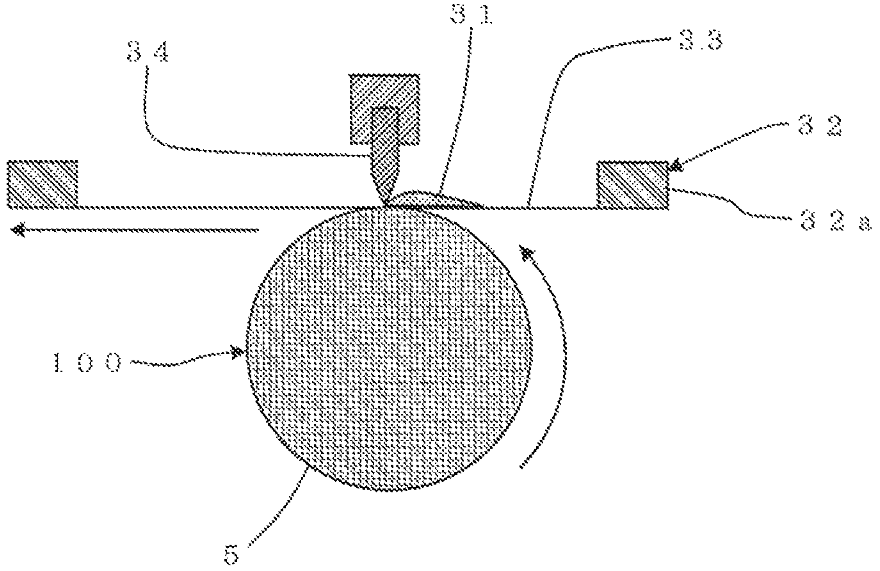
FIG. 2 is a schematic view showing that the ceramic honeycomb formed body is coated with the electrode paste in the forming step of the honeycomb formed body with the non-fired electrodes in the embodiment of the manufacturing method of the honeycomb structure according to the present invention, and showing a cross section of the ceramic honeycomb formed body which is orthogonal to a cell extending direction.

A forming step of a honeycomb formed body with non-fired electrodes in an embodiment of a manufacturing method of a honeycomb structure according to the present invention is as follows. That is, as shown in FIG. 1 and FIG. 2, a non-fired electrode forming operation is performed twice, to form a pair of non-fired electrodes (films of an electrode paste) on a side surface of a ceramic honeycomb formed body, thereby preparing the honeycomb formed body with the non-fired electrodes in the step. Moreover, in the non-fired electrode forming operation, first, an electrode paste 31 is attached to a plate 32 including a printing screen 33. Then, a side surface 5 of a ceramic honeycomb formed body 100 is brought into a pressed state by a squeegee 34 via the printing screen 33 of the plate 32. The ceramic honeycomb formed body 100 includes partition walls to divide and form a plurality of cells which extend from one end surface to the other end surface and become through channels of a fluid; and an outer peripheral wall positioned in the outermost periphery, and the body has a columnar shape provided with a curved side surface. Then, in the state, the ceramic honeycomb formed body 100 is rotated around a central axis, and the plate 32 is linearly moved along the side surface 5 of the ceramic honeycomb formed body 100 synchronously with the rotation of the ceramic honeycomb formed body 100. Consequently, the squeegee 34 allows the electrode paste 31 attached to "the surface of the printing screen 33 opposite to the surface thereof which comes in contact with the ceramic honeycomb formed body 100" to permeate the printing screen 33 and coat the side surface 5 of the ceramic honeycomb formed body 100. In the manufacturing method of the honeycomb structure of the present embodiment, the shape of the ceramic honeycomb formed body is cylindrical. The non-fired electrode forming operation is performed twice, to form a pair of non-fired electrodes.

Figure 3:
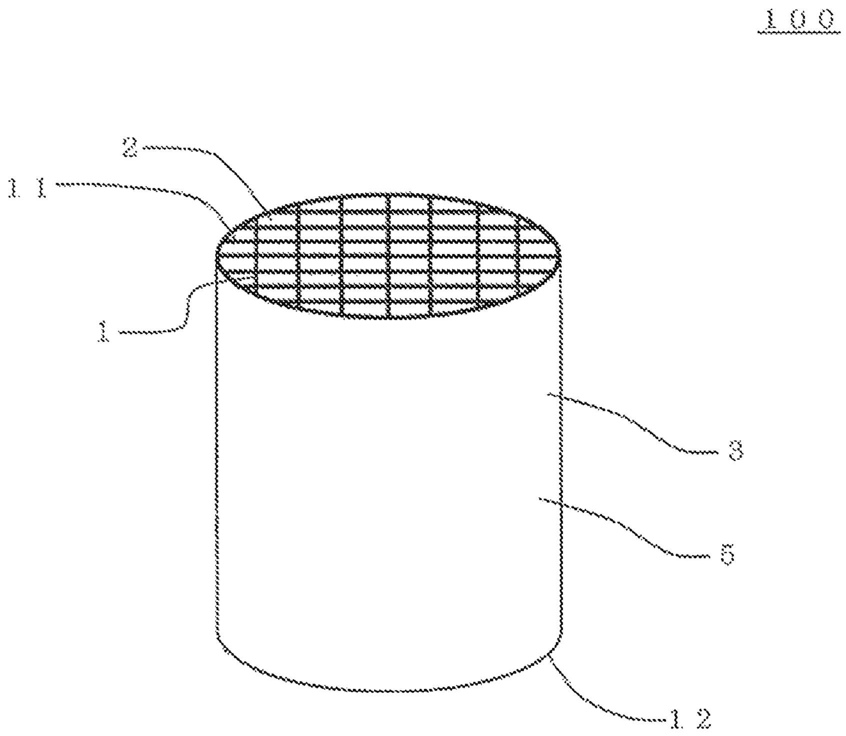
FIG. 3 is a perspective view schematically showing the ceramic honeycomb formed body to be coated with the electrode paste in the forming step of the honeycomb formed body with the non-fired electrodes in the embodiment of the manufacturing method of the honeycomb structure according to the present invention.
Figure 4:
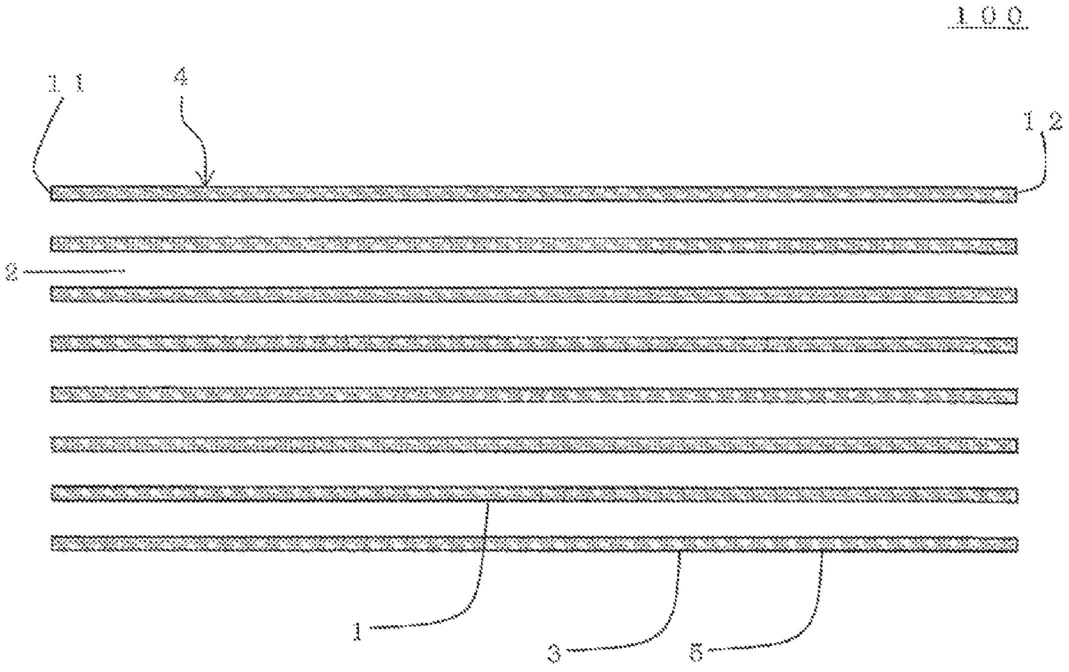
FIG. 4 is a schematic view showing a cross section of the ceramic honeycomb formed body to be coated with the electrode paste in the forming step of the honeycomb formed body with the non-fired electrodes in the embodiment of the manufacturing method of the honeycomb structure according to the present invention, the cross section being parallel to the cell extending direction.

As shown in FIG. 3 and FIG. 4, the cylindrical ceramic honeycomb formed body 100 includes partition walls 1 to divide and form a plurality of cells 2 which extend from one end surface 11 to the other end surface 12 and become through channels of a fluid; and an outer peripheral wall 3 positioned in the outermost periphery. FIG. 3 is a perspective view schematically showing the ceramic honeycomb formed body to be coated with the electrode paste in the "honeycomb formed body with the non-fired electrodes" forming step in the embodiment of the manufacturing method of the honeycomb structure according to the present invention. FIG. 4 is a schematic view showing a cross section of the ceramic honeycomb formed body to be coated with the electrode paste in the "honeycomb formed body with the non-fired electrodes" forming step in the embodiment of the manufacturing method of the honeycomb structure according to the present invention, the cross section being parallel to a cell extending direction.

Moreover, the non-fired electrode forming operation is performed by the method shown in FIG. 1 and FIG. 2. The non-fired electrode forming operation is a configuration of a printing process. Specifically, the electrode paste 31 is attached to the plate 32 including the printing screen 33. Then, in a state where the side surface 5 of the ceramic honeycomb formed body 100 having a cylindrical shape is pressed by the squeegee 34 via the printing screen 33 of the plate 32, the ceramic honeycomb formed body 100 is rotated around the central axis. Furthermore and simultaneously, the plate 32 is linearly moved along the side surface 5 of the ceramic honeycomb formed body 100 synchronously with the rotation of the ceramic honeycomb formed body 100. Consequently, the squeegee 34 allows the electrode paste 31 attached to the plate 32 to permeate the printing screen 33 and coat the side surface 5 of the ceramic honeycomb formed body 100. In consequence, the non-fired electrodes are formed on the side surface 5 of the ceramic honeycomb formed body 100. Thus, when the non-fired electrode forming operation is performed twice, the pair of non-fired electrodes are formed on the side surface 5 of the ceramic honeycomb formed body 100. The pair of non-fired electrodes are fired to become a pair of electrodes. FIG. 1 is a perspective view schematically showing that the ceramic honeycomb formed body is coated with the electrode paste in the forming step of the honeycomb formed body with the non-fired electrodes in the embodiment of the manufacturing method of the honeycomb structure according to the present invention. FIG. 2 shows that the ceramic honeycomb formed body is coated with the electrode paste in the forming step of the honeycomb formed body with the non-fired electrodes in the embodiment of the manufacturing method of the honeycomb structure according to the present invention. Moreover, FIG. 2 shows a cross section of the ceramic honeycomb formed body which is cut along a plane orthogonal to the cell extending direction of the ceramic honeycomb formed body.

When the non-fired electrode forming operation is performed, the cylindrical ceramic honeycomb formed body 100 is preferably disposed so that the central axis becomes parallel to a horizontal plane, and the plate is preferably horizontally disposed on the body in a vertical direction thereof. At this time, the central axis of the ceramic honeycomb formed body 100 becomes parallel to the printing screen 33 of the plate 32.

Then, the electrode paste 31 is preferably put on the printing screen 33 of the plate 32, and the electrode paste 31 is preferably spread in a region of the printing screen 33 which is to be used in the printing. At this time, a printing pattern (holes) of the printing screen 33 may be filled with the electrode paste 31 by use of a scraper or the like. When the scraper made of a resin is used, the printing pattern can be filled with plenty of electrode paste. Furthermore, "unevenness" of surface roughness of the obtained electrodes can be decreased.

When the side surface 5 of the cylindrical ceramic honeycomb formed body 100 is pressed by the squeegee 34 via the printing screen 33 of the plate 32, the squeegee 34 is preferably disposed so that a longitudinal direction becomes parallel to the central axis direction of the ceramic honeycomb formed body 100. Here, the meaning of "the side surface 5 of the ceramic honeycomb formed body 100 is pressed by the squeegee 34 via the printing screen 33 of the plate 32" is as follows. That is, it is meant that in a state where the printing screen 33 is sandwiched between the side surface 5 of the ceramic honeycomb formed body 100 and the squeegee 34, the side surface 5 of the ceramic honeycomb formed body 100 is pressed by the squeegee 34 from above the printing screen 33.

A pressure when the squeegee 34 presses the side surface 5 of the ceramic honeycomb formed body 100 is preferably from 0.05 to 0.4 MPa, and further preferably from 0.07 to 0.2 MPa. When the pressure is smaller than 0.05 MPa, the pressure is excessively small, and hence the side surface 5 of the ceramic honeycomb formed body 100 is not easily coated with the film of the electrode paste. The electrodes become thin, and a thickness of each electrode becomes non-uniform sometimes. When the pressure is larger than 0.4 MPa, the pressure is excessively large, and hence the surface is coated with a thin film of the electrode paste, whereby the electrodes become thin sometimes.

Figure 12:
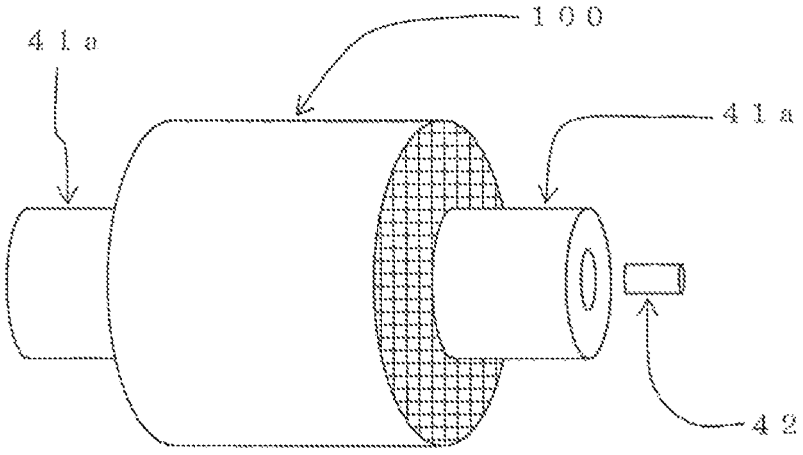
FIG. 12 is a perspective view schematically showing that end surface grip portions are attached to the ceramic honeycomb formed body, and an image pickup device is disposed.

When the ceramic honeycomb formed body 100 is rotated around the central axis and the plate 32 is linearly moved along the side surface 5 of the ceramic honeycomb formed body 100 synchronously with the rotation of the ceramic honeycomb formed body 100, the plate 32 moves as follows. That is, the plate 32 linearly moves in a direction orthogonal to the central axis direction of the ceramic honeycomb formed body 100. Moreover, when the plate 32 is linearly moved along the side surface 5 of the ceramic honeycomb formed body 100 synchronously with the rotation of the ceramic honeycomb formed body 100, the following moving is meant. That is, it is meant that the plate 32 is linearly moved without slipping on the side surface 5 of the ceramic honeycomb formed body 100 while the plate comes in contact with the side surface 5 of the ceramic honeycomb formed body 100. Furthermore, when the ceramic honeycomb formed body 100 is rotated around the central axis, end surface grip portions 41 are preferably attached to both end surfaces of the ceramic honeycomb formed body 100, and the end surface grip portions 41 are preferably rotated to rotate the ceramic honeycomb formed body 100. A material of the end surface grip portions 41 is preferably a resin. Examples of the resin include urethane rubber. To decrease the unevenness of the thickness of each formed electrode, the end surface grip portions 41 are preferably arranged in the center of the ceramic honeycomb formed body. To this end, as shown in, for example, FIG. 12, cylindrical end surface grip portions 41*a* are preferably used, and while confirming positions of the end surface grip portions 41*a* with an image pickup device 42, the end surface grip portions 41*a* are preferably arranged in the center of the ceramic honeycomb formed body. When the positions of the end surface grip portions 41*a* are confirmed with the image pickup device 42, the ceramic honeycomb formed body and the end surface grip portions 41*a* are preferably observed through "center hole of the end surface grip portions 41*a*" by use of the image pickup device 42. In consequence, a positional relation between the ceramic honeycomb formed body and each of the end surface grip portions 41*a* can be confirmed, and the end surface grip portions 41*a* can be arranged in the center of the ceramic honeycomb formed body. Specifically, examples of the image pickup device include a CCD camera. FIG. 12 is a perspective view schematically showing that the end surface grip portions 41*a* are attached to the ceramic honeycomb formed body and that the image pickup device 42 is disposed.

A moving speed of the plate 32 is preferably from 10 to 200 mm/second, and further preferably from 20 to 150 mm/second. When the speed is lower than 10 mm/second, productivity deteriorates sometimes. When the speed is higher than 200 mm/second, the side surface 5 of the ceramic honeycomb formed body 100 is not easily coated with the electrode paste.

When the squeegee 34 allows the electrode paste 31 attached to the plate 32 to permeate the printing screen 33 and coat the side surface 5 of the ceramic honeycomb formed body 100, the squeegee 34 is preferably a stationary state in a horizontal direction. Moreover, an angle of the squeegee 34 to the printing screen 33 is preferably from 5 to 80°, and further preferably from 10 to 60°. When the angle is smaller than 5°, an amount of the paste to be discharged decreases, or the paste is not discharged sometimes. When the angle is larger than 80°, the paste is scratched toward a front side in the moving direction of the squeegee 34, and the non-fired electrodes become thin sometimes. It is to be noted that the angle of the squeegee 34 to the printing screen 33 is an angle of the squeegee 34 on a side "in a direction opposite to the moving direction of the printing screen 33" among angles formed between the printing screen 33 and the squeegee 34.

Figure 5:
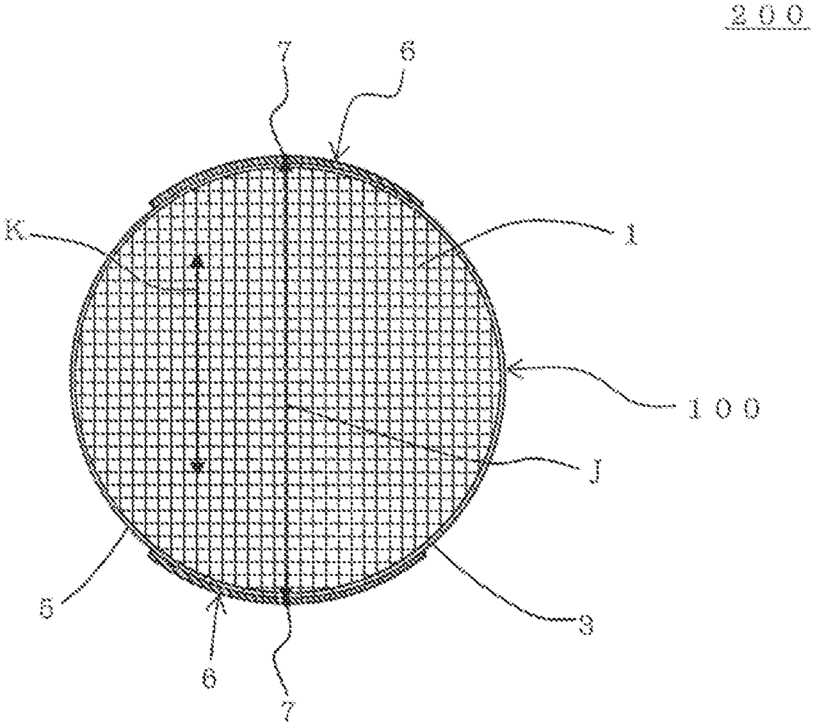
FIG. 5 is a schematic view showing a cross section of the honeycomb formed body with the non-fired electrodes which is obtained in the forming step of the honeycomb formed body with the non-fired electrodes in the embodiment of the manufacturing method of the honeycomb structure according to the present invention, the cross section being orthogonal to the cell extending direction.

Moreover, when the non-fired electrode forming operation is performed twice to form the pair of non-fired electrodes on the side surface of the ceramic honeycomb formed body, the electrodes are preferably formed as follows. That is, as shown in FIG. 5, in a cross section which is orthogonal to the cell extending direction, one non-fired electrode 6 is preferably disposed on a side opposite to the other non-fired electrode 6 via the center of the ceramic honeycomb formed body 100. FIG. 5 is a schematic view showing the cross section of a honeycomb formed body 200 with the non-fired electrodes which is obtained in the forming step of the honeycomb formed body with the non-fired electrodes in the embodiment of the manufacturing method of the honeycomb structure according to the present invention, the cross section being orthogonal to the cell extending direction.

Moreover, in the cross section of the honeycomb formed body 200 with the non-fired electrodes which is orthogonal to the cell extending direction, a direction in which centers 7 and 7 of the respective non-fired electrodes 6 "in an outer peripheral direction of the ceramic honeycomb formed body" are connected to each other is a direction J. At this time, the honeycomb formed body with the non-fired electrodes is preferably prepared so that in the cross section of the honeycomb formed body 200 with the non-fired electrodes which is orthogonal to the cell extending direction, the direction J matches a direction K in which part of the partition walls extend, in a range of ±15° (see FIG. 5). As shown in FIG. 5, an angle formed by the direction J in which the centers 7 and 7 of the respective non-fired electrodes 6 "in the outer peripheral direction of the ceramic honeycomb formed body" are connected to each other and the direction K in which part of the partition walls extend is further preferably 0° (the direction J is parallel to the direction K). In the manufactured honeycomb structure, when a relative positional relation between the arrangement of the electrodes and the extending direction of the partition walls varies, especially a resistance in the vicinity of each electrode of the honeycomb structure varies, and hence stabilized uniform heat generation is impaired sometimes. Therefore, in a manufacturing process, the angle between the direction J in which the centers of the non-fired electrodes 6 are connected to each other and the direction K in which part of the partition walls extend preferably falls in the above range. When the ceramic honeycomb formed body is coated with the electrode paste, the following operation is preferably performed. That is, first, the direction of the cells in the end surface of the ceramic honeycomb formed body (a partition wall extending direction) is recognized by use of image processing. Then, based on the data, the direction of the cells of the ceramic honeycomb formed body (the partition wall extending direction) is preferably regulated to a predetermined direction by use of a control device or the like. In consequence, the non-fired electrodes can be arranged in accordance with the cell direction (the partition wall extending direction) of the ceramic honeycomb formed body.

In the forming step of the honeycomb formed body with the non-fired electrodes, a control device of the ceramic honeycomb formed body is preferably used. The control device of the ceramic honeycomb formed body preferably can "rotate the ceramic honeycomb formed body around the central axis", and "move the ceramic honeycomb formed body upwards and downwards in the vertical direction". Furthermore, a plate control device which can "move the plate linearly on a horizontal plane" and a squeegee control device which can "move the squeegee upwards and downwards in the vertical direction" are preferably used.

In the forming step of the honeycomb formed body with the non-fired electrodes, for example, first, the ceramic honeycomb formed body is disposed in the control device of the ceramic honeycomb formed body, the plate is disposed in the plate control device, and the squeegee is disposed in the squeegee control device. Moreover, when these disposing operations are performed, the squeegee is preferably disposed above the plate in the vertical direction so that the squeegee does not come in contact with the plate, and the ceramic honeycomb formed body is preferably disposed below the plate in the vertical direction so that the body does not come in contact with the plate. Then, the electrode paste is put on the printing screen of the plate (an upward surface in the vertical direction). Then, the ceramic honeycomb formed body is raised by the control device of the ceramic honeycomb formed body so that the body comes in contact with the lower surface of the printing screen (a downward surface in the vertical direction). Moreover, the squeegee is preferably lowered by the squeegee control device to press the ceramic honeycomb formed body via the printing screen. When the ceramic honeycomb formed body is raised by the control device of the ceramic honeycomb formed body, the ceramic honeycomb formed body may be disposed at a position where a suitable clearance is formed between the ceramic honeycomb formed body and the printing screen. Then, while the ceramic honeycomb formed body is pressed by the squeegee via the printing screen, the ceramic honeycomb formed body is rotated around the central axis by the control device of the ceramic honeycomb formed body. Simultaneously, the plate is preferably linearly moved by the plate control device synchronously with the rotation of the ceramic honeycomb formed body. In consequence, the electrode paste permeates the printing screen to coat the ceramic honeycomb formed body.

As shown in FIG. 1 and FIG. 2, the squeegee 34 is preferably formed in a plate-like shape which is long in one direction. A material of the squeegee 34 is preferably urethane or the like. Moreover, a hardness of the squeegee 34 is preferably from 30 to 90 degrees, and further preferably from 40 to 70 degrees. Thus, when the hardness of the squeegee is lowered, the squeegee 34 easily follows the shape of the side surface of the ceramic honeycomb formed body 100, and the thickness of each non-fired electrode can be made uniform. When the hardness is lower than 30 degrees, the ceramic honeycomb formed body 100 is not easily pressed by the squeegee 34, and the ceramic honeycomb formed body 100 is not easily coated with the electrode paste 31 having a uniform thickness. When the hardness is higher than 90 degrees, the squeegee 34 does not easily follow the shape of the side surface of the ceramic honeycomb formed body 100, and the thickness of each non-fired electrode becomes non-uniform sometimes. The hardness of the squeegee is Shore (Hs) hardness according to a hardness meter of JIS K603 Standard.

As shown in FIG. 1 and FIG. 2, the plate 32 preferably includes a frame 32*a* and the printing screen 33 disposed on the frame 32*a*. There are not any special restrictions on the frame 32*a*, as long as the frame is a structure formed in such a ring-like shape as to surround an outer edge of the printing screen 33. There are not any special restrictions on a material of the frame 32*a*, but stainless steel, aluminum, iron or the like is preferable.

As the printing screen 33, a mesh-like screen, a sheet-like screen or the like is preferably used. When the mesh-like screen is used as the printing screen 33, the screen may be used as it is, or a resin or the like may be put on the printing screen so that a desirable printing pattern is formed. When the resin, a metal or the like is put on the printing screen, a shape of a mesh portion on which the resin, the metal or the like is not put becomes the printing pattern. Moreover, when the sheet-like screen is used as the printing screen 33, holes are preferably made in the screen to form the desirable printing pattern (the holes).

A thickness of the printing screen 33 (in the case of a mesh-like shape, a sheet thickness) is preferably from 22 to 300 μm, and further preferably from 100 to 250 μm. When the thickness of the printing screen 33 is set to such a range, the thickness of each electrode of the obtained honeycomb structure can be made larger. Specifically, the thickness of the electrode of the honeycomb structure can be from 10 to 2000 μm. When the thickness of the printing screen 33 is smaller than 22 μm, the electrodes of the obtained honeycomb structure become excessively thin. When the thickness of the printing screen 33 is larger than 300 μm, the electrodes of the obtained honeycomb structure become excessively thick.

There are not any special restrictions on the material of the printing screen 33, but examples of the material include stainless steel (SUS).

Moreover, to decrease the unevenness of the thickness of each of the electrodes to be formed, the hardness of the squeegee is preferably lowered to lower a tension of the printing screen 33. The tension is a tensile force for extending screen mesh in the screen plate, and an index for evaluating a degree of a push-in amount which is generated when the plate is pressed by the squeegee. In the present description, the tension is a bend amount (mm) measured by using a tension gauge. For example, when a tension gauge "STG-80D" manufactured by Protech Co., Ltd. is used, it is represented by a bend amount (mm) when a load (2.354 N) is applied. When the tension is low, the push-in amount increases even with the same applied pressure, followability to a shape of a material to be printed improves, but plate releasability after squeezing deteriorates. When the tension is high, the followability to the shape of the material to be printed deteriorates, but printing stability enhances owing to the enhancement of the plate releasability, Specifically, the hardness of the squeegee is preferably from 30 to 90, and the tension of the printing screen 33 is preferably from 1.0 to 2.0 mm.

Furthermore, a length of the squeegee (the length in a longitudinal direction) is preferably 0.1 to 10 cm smaller than a length of the ceramic honeycomb formed body in the central axis direction. However, when a pattern width is small, the length may be 10 cm or more smaller than the length of the ceramic honeycomb formed body in the central axis direction. Moreover, the length of the squeegee (the length in the longitudinal direction) may be 0.5 cm larger than the pattern width. In consequence, when the squeegee presses the side surface of the ceramic honeycomb formed body, the squeegee can be prevented from coming in contact with an end (an outer peripheral portion of the end surface) of the ceramic honeycomb formed body. Therefore, even when the center of the ceramic honeycomb formed body in the axial direction is recessed as much as about 1 mm (e.g., even when the body has such a shape as in a columnar body A shown in FIG. 9 and a concave B is about 1 mm), the squeegee easily follows the shape of the ceramic honeycomb formed body. In consequence, the unevenness of the thickness of each of the formed electrodes can be made smaller.

In the manufacturing method of the honeycomb structure of the present embodiment, the electrode paste is preferably a mixture of silicon carbide powder (silicon carbide), metal silicon powder (metal silicon), a binder, a surfactant, a pore former, water and the like.

The electrode paste is preferably formed by adding a predetermined additive to the silicon carbide powder and the silicon powder, followed by kneading. There are not any special restrictions on a kneading method, and, for example, a vertical stirrer can be used.

Specifically, the metal silicon powder (the metal silicon), the binder, the surfactant, the pore former, the water and the like are preferably added to the silicon carbide powder (silicon carbide), and kneaded therewith to prepare the electrode paste. When a total mass of the silicon carbide powder and the metal silicon is 100 parts by mass, the mass of the metal silicon is preferably from 20 to 40 parts by mass.

Examples of the binder can include methylcellulose, hydroxypropyl methylcellulose, hydroxypropyl cellulose, hydroxyethyl cellulose, carboxymethylcellulose, and polyvinyl alcohol. Among these binders, methylcellulose and hydroxypropyl cellulose are preferably used together. A content of the binder is preferably from 0.1 to 5.0 parts by mass, when the total mass of the silicon carbide powder and the metal silicon powder is 100 parts by mass.

A content of the water is preferably from 15 to 60 parts by mass, when the total mass of the silicon carbide powder and the metal silicon powder is 100 parts by mass.

As the surfactant, ethylene glycol, dextrin, fatty acid soap, polyalcohol or the like can be used. One of these surfactants may be used alone, or two or more thereof may be combined and used. A content of the surfactant is preferably 0.1 to 2.0 parts by mass, when the total mass of the silicon carbide powder and the metal silicon powder is 100 parts by mass.

There are not any special restrictions on the pore former, as long as pores are formed after firing. Examples of the pore former can include graphite, starch, resin balloon, water-absorbing resin, and silica gel. A content of the pore former is preferably from 0.1 to 5.0 parts by mass, when the total mass of the silicon carbide powder and the metal silicon powder is 100 parts by mass. An average particle diameter of the pore former is preferably from 10 to 30 μm. When the diameter is smaller than 10 μm, the pores cannot sufficiently be formed sometimes. When the diameter is larger than 30 μm, large pores are easily formed, and strength deteriorates sometimes. The average particle diameter of the pore former is a value measured by a laser diffraction method.

There are not any special restrictions on a method of preparing the ceramic honeycomb formed body in the manufacturing method of the honeycomb structure of the present embodiment, and any known methods can be used. For example, the following method can be used.

First, metal silicon powder (metal silicon), a binder, a surfactant, a pore former, water and the like are added to silicon carbide powder (silicon carbide), to prepare a forming raw material. A mass of metal silicon is preferably from 10 to 40 mass % of a total of a mass of silicon carbide powder and the mass of metal silicon. An average particle diameter of silicon carbide particles in the silicon carbide powder is preferably from 3 to 50 μm, and further preferably from 3 to 40 μm. An average particle diameter of metal silicon (the metal silicon powder) is preferably from 2 to 35 μm. The average particle diameters of the silicon carbide particles and metal silicon (the metal silicon particles) are values measured by a laser diffraction method. It is to be noted that this is a blend of the forming raw material, when the material of a honeycomb structure part is a silicon-silicon carbide composite material. When the material of the honeycomb structure part is silicon carbide, the metal silicon is not added.

Examples of the binder can include methylcellulose, and hydroxypropyl methylcellulose. A content of the binder is preferably from 2 to 10.0 parts by mass, when the total mass of the silicon carbide powder and the metal silicon powder is 100 parts by mass.

A content of the water is preferably from 20 to 60 parts by mass, when the total mass of the silicon carbide powder and the metal silicon powder is 100 parts by mass.

As the surfactant, ethylene glycol, dextrin or the like can be used. A content of the surfactant is preferably 0.1 to 2.0 parts by mass, when the total mass of the silicon carbide powder and the metal silicon powder is 100 parts by mass.

There are not any special restrictions on the pore former, as long as the pores are made after the firing. Examples of the pore former can include graphite, starch, resin balloon, water-absorbing resin, and silica gel. A content of the pore former is preferably from 0.5 to 10.0 parts by mass, when the total mass of the silicon carbide powder and the metal silicon powder is 100 parts by mass.

Next, the forming raw material is preferably kneaded to form a kneaded material. There are not any special restrictions on a method of kneading the forming raw material to form the kneaded material, and examples of the method can include methods using a kneader, a vacuum clay kneader.

Next, the kneaded material is preferably extruded to form the honeycomb formed body. During the extrusion forming, a die having a desirable whole shape, cell shape, partition wall thickness and cell density, and the like is preferably used. As a material of the die, a hard metal which does not easily wear is preferable. The honeycomb formed body is a structure including partition walls to divide and form a plurality of cells which become through channels of a fluid and an outer peripheral wall positioned in the outermost periphery.

The obtained honeycomb formed body is preferably dried and fired to prepare the ceramic honeycomb formed body. It is to be noted that the ceramic honeycomb formed body is preferably the fired honeycomb formed body, but may be the dried honeycomb formed body.

Figure 6:
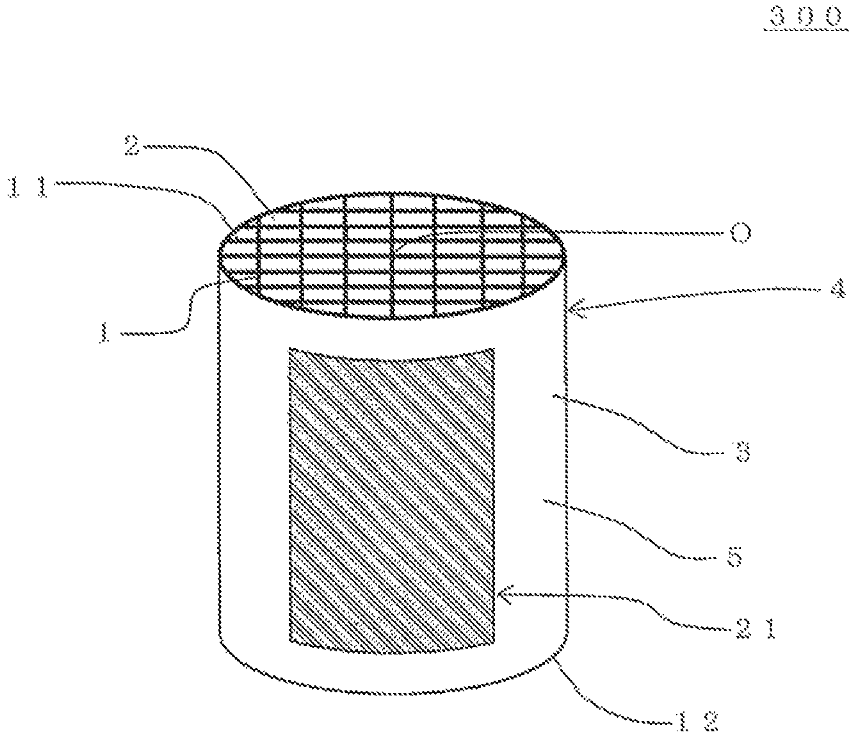
FIG. 6 is a perspective view schematically showing a honeycomb structure manufactured by the embodiment of the manufacturing method of the honeycomb structure according to the present invention.
Figure 7:
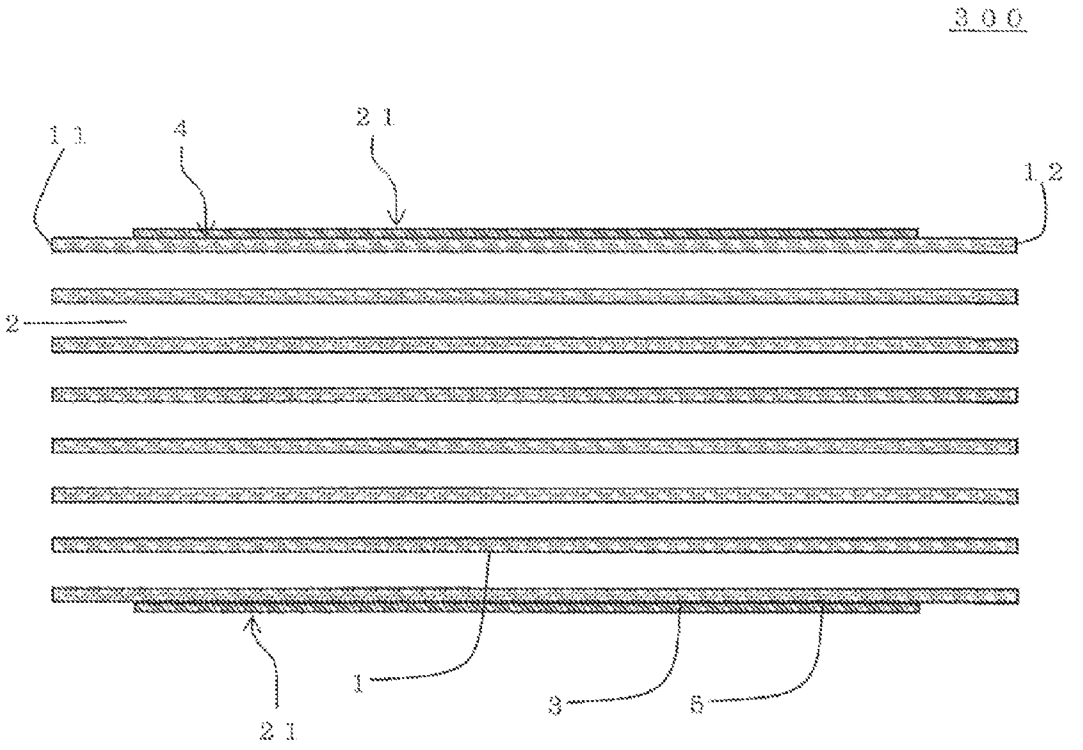
FIG. 7 is a schematic view showing a cross section of the honeycomb structure manufactured by the embodiment of the manufacturing method of the honeycomb structure according to the present invention, the cross section being parallel to the cell extending direction.

(1-2) Honeycomb Structure Forming Step:

Next, the honeycomb formed body with the non-fired electrodes is fired, to prepare a honeycomb structure 300 including a pair of electrodes on a side surface thereof as shown in FIG. 6 and FIG. 7. When the honeycomb formed body with the non-fired electrodes is fired and the ceramic honeycomb formed body is obtained by firing the honeycomb formed body, the non-fired electrodes are fired. Moreover, when the ceramic honeycomb formed body is obtained by drying the honeycomb formed body, the ceramic honeycomb formed body and the non-fired electrodes are fired. FIG. 6 is a perspective view schematically showing the honeycomb structure manufactured by the embodiment of the manufacturing method of the honeycomb structure according to the present invention. FIG. 7 is a schematic view showing a cross section of the honeycomb structure manufactured by the embodiment of the manufacturing method of the honeycomb structure according to the present invention, the cross section being parallel to a cell extending direction.

The honeycomb formed body with the non-fired electrodes is preferably dried before fired. Drying conditions are preferably from 50 to 100° C.

Moreover, after drying the honeycomb formed body with the non-fired electrodes, the body is preferably calcinated to remove the binder and the like. The calcinating is preferably performed in the atmosphere at 400 to 500° C. for 0.5 to 20 hours.

After drying the honeycomb formed body with the non-fired electrodes, the body is preferably fired. As firing conditions, the body is preferably heated in inactive atmosphere of nitrogen, argon or the like at 1400 to 1500° C. for one to 20 hours. Moreover, after the firing, an oxygenation treatment is preferably performed at 1200 to 1350° C. for one to ten hours, for the enhancement of durability.

There are not any special restrictions on calcinating and firing methods, and the firing can be performed by using an electric furnace, a gas furnace or the like.

(2) Honeycomb Structure:

Next, the honeycomb structure obtained by the embodiment of the manufacturing method of the honeycomb structure of the present invention will be described.

As shown in FIG. 6 and FIG. 7, the honeycomb structure 300 obtained by the manufacturing method of the honeycomb structure of the present embodiment includes the partition walls 1, a honeycomb structure part 4 and a pair of electrodes 21 and 21. The partition walls 1 are porous partition walls to divide and form a plurality of cells 2 which extend from one end surface 11 to the other end surface 12 and become through channels of a fluid. The honeycomb structure part 4 has a columnar shape "with a side surface being a curved surface", and also includes the outer peripheral wall 3 positioned in the outermost periphery. The pair of electrodes 21 and 21 are arranged on the side surface of the honeycomb structure part 4. The ceramic honeycomb formed body in the manufacturing method of the honeycomb structure of the present embodiment becomes the honeycomb structure part 4. Moreover, in the honeycomb structure obtained by the manufacturing method of the honeycomb structure of the present embodiment, the shape of the honeycomb structure part 4 is cylindrical.

An electric resistance of the honeycomb structure part 4 is preferably from 1 to 200 Ωcm. In consequence, when a voltage is applied to the pair of electrodes 21 and 21, heat can effectively be generated from the honeycomb structure (the honeycomb structure part). Especially, even when a current is passed by using a power source having a high voltage (e.g., from 12 to 900 V), the current does not excessively flows, and the honeycomb structure can suitably be used as a heater. It is to be noted that the electric resistance of the honeycomb structure part is a value at 400° C. Moreover, the electric resistance of the honeycomb structure part is a value measured by a four-terminals process.

Furthermore, each of the pair of electrodes 21 and 21 is preferably formed in a band-like shape extending in an extending direction of the cells 2 of the honeycomb structure part 4. Furthermore, in a cross section orthogonal to the extending direction of the cells 2, one electrode 21 in the pair of electrodes 21 and 21 is preferably disposed on a side opposite to the other electrode 21 in the pair of electrodes 21 and 21 via a center O of the honeycomb structure part 4. In consequence, when the voltage is applied between the pair of electrodes 21 and 21, deviation of the current flowing through the honeycomb structure part 4 can be suppressed. Then, the deviation of the heat generation in the honeycomb structure part 4 can be suppressed.

Figure 8:
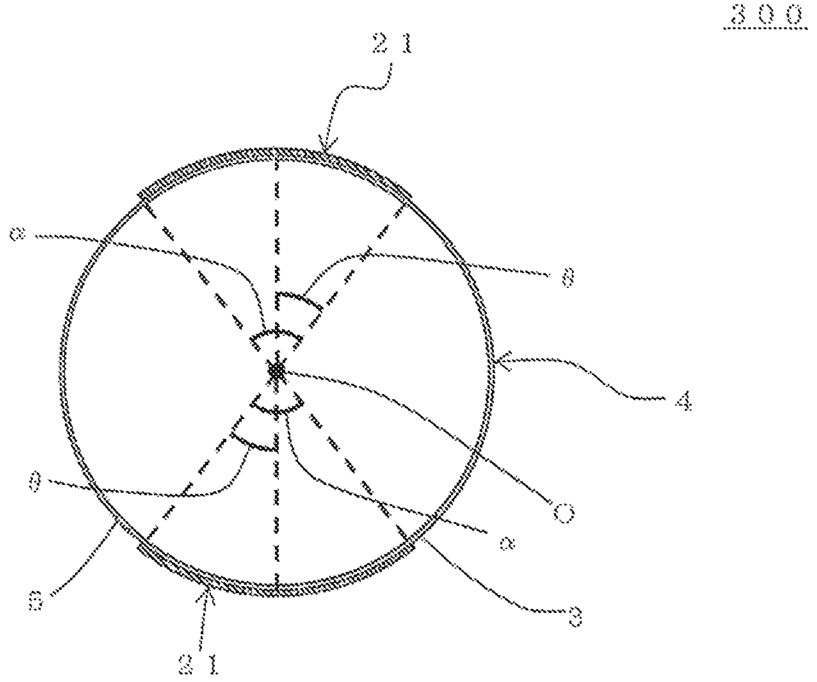
FIG. 8 is a schematic view showing a cross section of the honeycomb structure manufactured by the embodiment of the manufacturing method of the honeycomb structure according to the present invention, the cross section being orthogonal to the cell extending direction.

Moreover, in the honeycomb structure 300, as shown in FIG. 8, 0.5 time of a center angle α of each of the electrodes 21 and 21 (an angle θ of 0.5 time of the center angle α) is preferably from 15 to 65° in the cross section orthogonal to the extending direction of the cells. In consequence, when the voltage is applied between the pair of electrodes 21 and 21, the deviation of the current flowing through the honeycomb structure part 4 can further be suppressed. In consequence, the deviation of the heat generation in the honeycomb structure part 4 can further be suppressed. FIG. 8 is a schematic view showing a cross section of the honeycomb structure 300 manufactured by the embodiment of the manufacturing method of the honeycomb structure according to the present invention, the cross section being orthogonal to the cell extending direction. It is to be noted that in FIG. 8, the partition walls are omitted.

In the honeycomb structure 300, a material of the partition walls 1 and the outer peripheral wall 3 preferably contains "a silicon-silicon carbide composite material" or "silicon carbide" as a main component, and is further preferably "the silicon-silicon carbide composite material" or "silicon carbide". When it is described that "the material of the partition walls 1 and the outer peripheral wall 3 contains silicon carbide particles or silicon as the main component", it is meant that the partition walls 1 and the outer peripheral wall 3 contain 90 mass % or more of the silicon carbide particles and silicon in the whole content. When such a material is used, the electric resistance of the honeycomb structure part can be from 1 to 200 Ωcm. Here, the silicon-silicon carbide composite material contains silicon carbide particles as an aggregate, and silicon as a binder to bind the silicon carbide particles, and the silicon carbide particles are preferably bonded by silicon so that pores are formed among the silicon carbide particles. Moreover, the above "silicon carbide" is the sintered silicon carbide.

A thickness of each of the electrodes 21 is preferably from 0.01 to 2 mm, and further preferably from 0.1 to 1 mm. In such a range, the heat can uniformly be generated, and a strength at canning also becomes high. When the thickness of the electrode 21 is smaller than 0.01 mm, the electric resistance becomes high, and the heat cannot uniformly be generated sometimes. When the thickness is larger than 2 mm, the electrode breaks sometimes at the canning. Moreover, in the manufacturing method of the honeycomb structure of the present embodiment, it is possible to prepare such thick electrodes each having a uniform thickness on the curved surface (the side surface of the honeycomb structure part) by a printing process.

In the honeycomb structure obtained by the manufacturing method of the honeycomb structure of the present embodiment, the electrodes 21 preferably contain the silicon carbide particles and silicon as the main component, and the electrodes are further preferably formed by using the silicon carbide particles and silicon as raw materials, except usually contained impurities.

The electric resistance of each of the electrodes 21 is preferably from 0.1 to 100 Ωcm, and further preferably from 0.1 to 50 Ωcm. When the electric resistance of the electrode 21 is set to such a range, the pair of electrodes 21 and 21 effectively perform an electrode function in a pipe through which a high-temperature exhaust gas flows. In the honeycomb structure 300, the electric resistance of the electrode 21 is preferably lower than that of the honeycomb structure part 4. It is to be noted that the electric resistance of each electrode is a value at 400° C. Moreover, the electric resistance of each electrode is a value measured by the four-terminals process.

A porosity and an average pore diameter of each of the electrodes 21 can suitably be determined in accordance with a use application or so as to obtain a desirable electric resistance.

A partition wall thickness, a cell density, a partition wall porosity, a partition wall average pore diameter and an outer peripheral wall thickness of the honeycomb structure 300 (the honeycomb structure part 4) can suitably be determined in accordance with the use application.

There are not any special restrictions on a shape of the honeycomb structure of the present embodiment, as long as the shape is a columnar shape having a side surface (the outer peripheral surface) which is a curved surface. Examples of the shape of the honeycomb structure of the present embodiment include a columnar shape (a cylindrical shape) having a bottom surface (or a cross section orthogonal to a central axis) which is round, a columnar shape having an oval bottom surface, and a columnar shape having an elliptic bottom surface. Moreover, as to a size of the honeycomb structure, an area of the bottom surface is preferably from 2000 to 20000 $mm^2$, and further preferably from 4000 to 10000 $mm^2$. Furthermore, a length of the honeycomb structure in a central axis direction is preferably from 50 to 200 mm, and further preferably from 75 to 150 mm.

In the honeycomb structure 300, a shape of each of the cells 2 in the cross section orthogonal to the extending direction of the cells 2 is preferably a quadrangular shape, a hexagonal shape, an octagonal shape or a combination of these shapes. When the cell shape is set to such a shape, a pressure loss when passing an exhaust gas through the honeycomb structure 300 becomes small, and a purification performance of a catalyst becomes excellent.

EXAMPLES

Hereinafter, the present invention will further specifically be described with respect to examples, but the present invention is not limited to these examples.

Example 1

Silicon carbide (SiC) powder and metal silicon (Si) powder were mixed at a mass rate of 80:20. Then, to this material, hydroxypropyl methylcellulose as a binder and a water-absorbing resin as a pore former were added, and water was added, to obtain a forming raw material. The forming raw material was kneaded, to prepare a kneaded columnar material by a vacuum clay kneader. A content of the binder was 7 parts by mass, when a total of the silicon carbide (SiC) powder and the metal silicon (Si) powder was 100 parts by mass. A content of the pore former was 3 parts by mass, when the total of the silicon carbide (SiC) powder and the metal silicon (Si) powder was 100 parts by mass. A content of the water was 42 parts by mass, when the total of the silicon carbide (SiC) powder and the metal silicon (Si) powder was 100 parts by mass. An average particle diameter of the silicon carbide powder was 20 and an average particle diameter of the metal silicon powder was 6 μm. Moreover, an average particle diameter of the pore former was 20 μm. The average particle diameters of silicon carbide, metal silicon and the pore former were values measured by a laser diffraction method.

The obtained columnar kneaded material was extruded by using an extrusion-former, to obtain a honeycomb formed body. The obtained honeycomb formed body was dried by high-frequency dielectric heating, and then dried at 120° C. for two hours by use of a hot air dryer, and both end surfaces were cut by a predetermined amount. Then, the honeycomb formed body after dried was degreased, fired, and further subjected to an oxidation treatment, to obtain a ceramic honeycomb formed body. Degreasing conditions were 550° C. and three hours. Firing conditions were 1450° C. and two hours in argon atmosphere. Oxidation treatment conditions were 1300° C. and one hour.

Next, the silicon carbide (SiC) powder and the metal silicon (Si) powder were mixed at a mass rate of 60:40. Then, to this mixture, hydroxypropyl methylcellulose as a binder, glycerin as a moisture retaining agent and a surfactant as a dispersant were added, and water was added, followed by mixing. The mixture was kneaded to obtain an electrode paste. A content of the binder was 0.5 part by mass, when the total of the silicon carbide (SiC) powder and the metal silicon (Si) powder was 100 parts by mass. A content of glycerin was 10 parts by mass, when the total of the silicon carbide (SiC) powder and the metal silicon (Si) powder was 100 parts by mass. A content of the surfactant was 0.3 part by mass, when the total of the silicon carbide (SiC) powder and the metal silicon (Si) powder was 100 parts by mass. A content of the water was 42 parts by mass, when the total of the silicon carbide (SiC) powder and the metal silicon (Si) powder was 100 parts by mass. An average particle diameter of the silicon carbide powder was 52 μm, and an average particle diameter of the metal silicon powder was 6 μm. The average particle diameters of silicon carbide and metal silicon were values measured by the laser diffraction method. The kneading was performed by a vertical stirrer.

Next, the side surface of the ceramic honeycomb formed body was coated (printed) with the electrode paste in a band-like shape, to obtain the honeycomb formed body with non-fired electrodes. When the electrode paste was printed on the side surface of the ceramic honeycomb formed body, the following device was used. That is, there was used a control device of the ceramic honeycomb formed body which was capable of rotating the ceramic honeycomb formed body around a central axis and moving the ceramic honeycomb formed body upwards and downwards in a vertical direction. Moreover, there were used a plate control device capable of linearly moving a plate on a horizontal plane, and a squeegee control device capable of moving a squeegee upwards and downwards in the vertical direction.

First, the ceramic honeycomb formed body was disposed in the control device of the ceramic honeycomb formed body so that the central axis was parallel to the horizontal plane. Then, the plate was disposed in the plate control device so that a printing screen was parallel to the horizontal plane. Then, a plate-like squeegee was disposed in the squeegee control device so that a longitudinal direction was parallel to the horizontal plane. By these operations, the squeegee was disposed above the plate in the vertical direction so that the squeegee did not come in contact with the plate, and the ceramic honeycomb formed body was disposed below the plate in the vertical direction so that the body did not come in contact with the plate.

Then, the electrode paste was put on the printing screen of the plate (an upward surface in the vertical direction). Then, the ceramic honeycomb formed body was raised by the control device of the ceramic honeycomb formed body so that the body came in contact with the lower surface of the printing screen, and the squeegee was lowered by the squeegee control device to press the ceramic honeycomb formed body via the printing screen. It is to be noted that the lower surface of the printing screen is a downward surface in the vertical direction. Then, as shown in FIG. 1 and FIG. 2, while a ceramic honeycomb formed body 100 was pressed by a squeegee 34, the ceramic honeycomb formed body 100 was rotated around the central axis, and a plate 32 was linearly moved. When the ceramic honeycomb formed body 100 was pressed by the squeegee 34, the ceramic honeycomb formed body 100 was pressed by the squeegee 34 via a printing screen 33. When rotating the ceramic honeycomb formed body 100 around the central axis, the ceramic honeycomb formed body 100 was rotated around the central axis by the control device of the ceramic honeycomb formed body. When linearly moving the plate 32, the plate 32 was linearly moved by the plate control device synchronously with the rotation of the ceramic honeycomb formed body 100. Thus, an electrode paste 31 was allowed to permeate the printing screen 33 and coat a side surface 5 of the ceramic honeycomb formed body 100 (a forming step of the honeycomb formed body with the non-fired electrodes).

Figure 10:
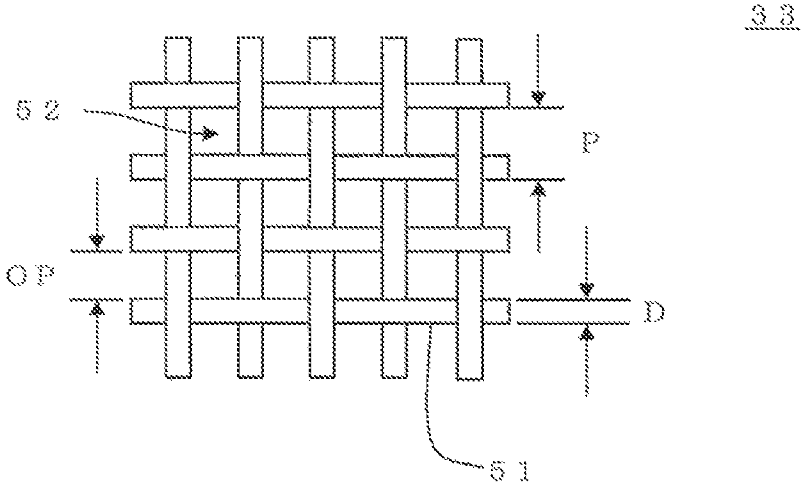
FIG. 10 is a plan view schematically showing part of a mesh-like printing screen.
Figure 11:
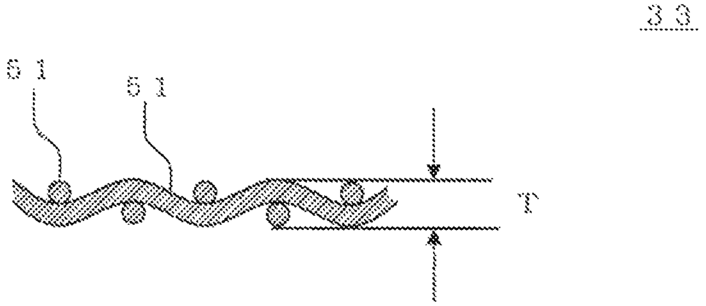
FIG. 11 is a sectional view showing a cross section of part of the mesh-like printing screen.

In the printing screen of the plate, as shown in FIG. 10 and FIG. 11, a film provided with a plurality of round holes and made of a resin was disposed on a mesh-like screen formed by braiding wires 51. The number of meshes of the printing screen 33 of the plate was 70 meshes, a sheet thickness T was 71 μm, opening OP was 292 μm, and a permeation volume was 77 $cm^3/m^2$. Here, the number of the meshes is the number of the wires per inch. Moreover, the opening OP is a value obtained by subtracting a diameter of the wire 51 (a wire diameter D) from a mesh pitch P. Furthermore, the mesh pitch P is a value calculated by "25.4 mm/mesh number". In addition, the permeation volume ($cm^3/m^2$) is a value calculated by "the sheet thickness×an opening area ratio". Moreover, the opening area ratio (%) is a ratio of an opening area 52, and a value calculated by "100×$(\text{openings})^2/(\text{the mesh pitch})^2$". A tension of the printing screen was 1.8 mm. Furthermore, an emulsion thickness was 40 μm. FIG. 10 is a plan view schematically showing part of the mesh-like printing screen. FIG. 11 is a schematic view showing a cross section of part of the mesh-like printing screen.

The printing screen had a thickness thereof increased to thickly form the non-fired electrodes. Therefore, to prevent an amount of the electrode paste which permeates the printing screen from decreasing (to raise a permeation rate of the electrode paste), the openings were enlarged to increase the permeation volume. Additionally, a material of the printing screen 33 (the material of the wires 51) was Tetron (registered trademark).

Moreover, the squeegee had a plate-like shape which was long in one direction, and pressed the ceramic honeycomb formed body by one long side (one end extending in a longitudinal direction) thereof. A hardness of the squeegee was 70 degrees. Furthermore, a material of the squeegee was urethane rubber. In addition, an angle of the squeegee to the printing screen was 70°. The angle of the squeegee to the printing screen is an angle of the squeegee on a side "in a direction opposite to the moving direction of the printing screen" among angles formed between the printing screen and the squeegee. Moreover, a pressure when the squeegee pressed the ceramic honeycomb formed body was 0.1 MPa. Furthermore, the length of the squeegee in the longitudinal direction was 110 mm.

Next, the honeycomb formed body with the non-fired electrodes was dried. Drying conditions were 70° C.

Afterward, the honeycomb formed body with the non-fired electrodes was degreased, fired, and further subjected to an oxidation treatment to obtain a honeycomb structure. Degreasing conditions were 550° C. and three hours. Firing conditions were 1450° C. and two hours in argon atmosphere. Oxidation treatment conditions were 1300° C. and one hour.

A bottom surface of the obtained honeycomb structure had a round shape with a diameter of 42 mm. A length of the honeycomb structure in a cell extending direction was 115 mm. Moreover, a thickness of each of two electrodes was from 120 to 130 μm, and the electrodes each having a uniform thickness were formed. Additionally, each electrode was formed so as to obtain a thickness in a range of 125 μm±10 μm, and it has been seen that the desired thickness was obtained. Furthermore, an electric resistance of the electrode was 1.3 Ω·cm, and an electric resistance of the honeycomb structure part was 100 Ωcm.

Reference Examples 1 and 2

Figure 9:
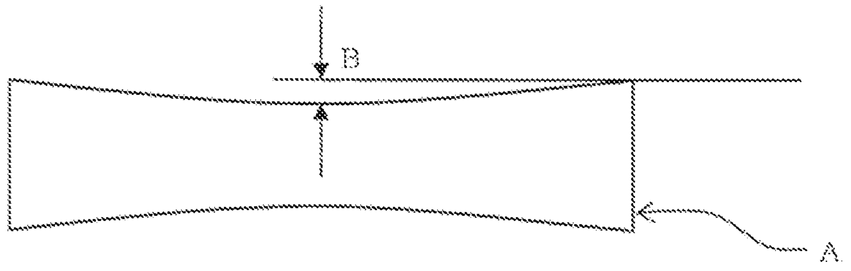
FIG. 9 is a side view schematically showing a shape of a columnar body used in a reference example.

To confirm an effect of a forming step of a honeycomb formed body with non-fired electrodes, a columnar body was subjected to the forming step of the honeycomb formed body with the non-fired electrodes of the above example 1, to form the non-fired electrodes (a film of an electrode paste) on a side surface of the columnar body. As the columnar body, as shown in FIG. 9, a columnar body A "having a column shape recessed so that the center of the side surface in an axial direction became thin". FIG. 9 is a side view schematically showing the shape of the columnar body A used in the reference examples.

As the columnar bodies, there were used a columnar body in which a concave (bend) B of the side surface was 0.5 mm (Reference Example 1) and a columnar body in which a concave (bend) B of the side surface was 1.0 mm (Reference Example 2). A material of the columnar bodies was chemical wood.

A thickness of each non-fired electrode in "the columnar body on which the non-fired electrodes were printed" obtained in Reference Example 1 was from 115 to 130 μm. The non-fired electrode was formed so as to obtain a thickness in a range of 125 μm±10 μm, and it has been seen that the desired thickness was obtained. A thickness of the non-fired electrode in "the columnar body on which the non-fired electrodes were printed" obtained in Reference Example 2 was from 100 to 120 μm. It has been seen that in Reference Example 2, the non-fired electrodes each having a slightly small thickness were obtained.

Reference Example 3

A columnar body was subjected to "the operation of the forming step of the honeycomb formed body with the non-fired electrodes" of Example 1 at the same position thereof twice (the position was repeatedly coated with the electrode paste), to form the non-fired electrodes (a film of an electrode paste) on a side surface of the columnar body. As the columnar body, as shown in FIG. 9, a columnar body A "having a column shape recessed so that the center of the side surface in an axial direction became thin". Moreover, a columnar body in which a concave (bend) B of the side surface was 1.0 mm was used. A material of the columnar body was chemical wood.

A thickness of each non-fired electrode in "the columnar body on which the non-fired electrodes were printed" obtained in Reference Example 3 was from 230 to 260 μm. In Reference Example 3, the body was repeatedly coated with the electrode paste, and a desired thickness of the non-fired electrode was 250 μm±20 μm. It has been seen that each of the obtained non-fired electrodes had the desired thickness.

It is seen from Example 1 that electrodes each having a uniform thickness of 120 to 130 μm can be formed on a side surface of a ceramic honeycomb formed body (a honeycomb structure part) by the manufacturing method of the honeycomb structure according to the present invention. Moreover, it is seen below from Reference Examples 1 to 3 when the forming step of a honeycomb formed body with non-fired electrodes is performed in the manufacturing method of the honeycomb structure of the present invention. That is, it is seen that according to the forming step of the honeycomb formed body with the non-fired electrodes, the electrodes each having a uniform thickness can be formed even on the side surface of the columnar body A having "a columnar shape recessed so that the center of the side surface in an axial direction becomes thin" as shown in FIG. 9.

Examples 2 to 4

Honeycomb structures were prepared in the same manner as in Example 1 except that a hardness of a squeegee was 60 degrees, and a squeegee length (the length in a longitudinal direction), a tension of a printing screen and an emulsion thickness shown in Table 1 were used. In a shape of the squeegee, "an end" which came in contact with the printing screen was tapered so that a tip became thin. In each obtained honeycomb structure, there were measured "a thickness" and "a surface roughness" of measurement portions of each electrode (a first measurement portion 61, a second measurement portion 62, a third measurement portion 63, and a fourth measurement portion 64 (see FIG. 13)). The results are shown in Table 1. In a column of "Evaluation" of Table 1, when both unevenness of "a thickness of an electrode" and unevenness of "a surface roughness of the electrode" indicate "remarkably suitable" results, the example is evaluated as "A", and when at least one of the results is "suitable", the example is evaluated as "B". As to "the thickness of the electrode", when a difference between a maximum value and a minimum value is 10 μm or less, it is evaluated that the example has a "remarkably suitable" result concerning the unevenness, and when the difference between the maximum value and the minimum value is in excess of 10 μm, and 20 μm or less, it is evaluated that the example has a "suitable" result concerning the unevenness. As to "the surface roughness of the electrode", when a difference between a maximum value and a minimum value is 1.00 μm or less, it is evaluated that the example has a "remarkably suitable" result concerning the unevenness, and when the difference between the maximum value and the minimum value is in excess of 1.00 μm, and 3.00 μm or less, it is evaluated that the example has a "suitable" result concerning the unevenness. It is to be noted that "the remarkably suitable result concerning the unevenness" means that the unevenness is remarkably small, and "the suitable result concerning the unevenness" means that the unevenness is small.

Figure 13:
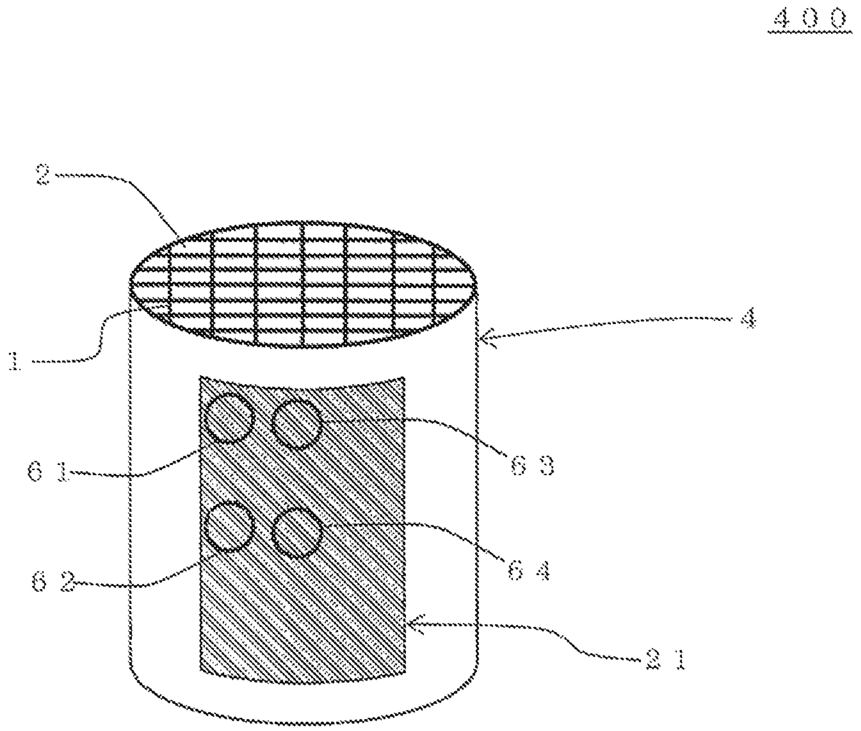
FIG. 13 is a perspective view schematically showing a honeycomb structure obtained in an example.

As shown in FIG. 13, the first measurement portion 61 in an electrode 21 of a honeycomb structure 400 is "one end of the electrode in "a central axis direction of the honeycomb structure", and is one end of the electrode in "an outer peripheral direction of the honeycomb structure"". Moreover, the second measurement portion 62 in the electrode 21 of the honeycomb structure 400 is "the center of the electrode in "the central axis direction of the honeycomb structure", and is one end of the electrode in "the outer peripheral direction of the honeycomb structure"". Furthermore, the third measurement portion 63 in the electrode 21 of the honeycomb structure 400 is "one end of the electrode in "the central axis direction of the honeycomb structure", and is the center of the electrode in "the outer peripheral direction of the honeycomb structure"". The fourth measurement portion 64 in the electrode 21 of the honeycomb structure 400 is "the center of the electrode in "the central axis direction of the honeycomb structure", and is the center of the electrode in "the outer peripheral direction of the honeycomb structure"". In Table 1, description of "axis:

end" indicates the one end of the electrode in the central axis direction. Moreover, description of "axis: center" indicates the center of the electrode in the central axis direction. Furthermore, description of "periphery: end" indicates the one end of the electrode in the outer peripheral direction. In addition, description of "periphery: center" indicates the center of the electrode in the outer peripheral direction. FIG. 13 is a perspective view schematically showing the honeycomb structure 400 obtained in the example.

The thickness of the electrode was measured by using a device "Surfcom 480A manufactured by Tokyo Seimitsu Co., Ltd.". A measuring method of the thickness of the electrode was a method of calculating the thickness from a shape profile in a cross section measuring mode. The surface roughness of the electrode was measured by using a device "Surfcom 480A manufactured by Tokyo Seimitsu Co., Ltd.". A measuring method of the surface roughness of the electrode was a method of setting "a cutoff value: 0.8" in a roughness measuring mode. Moreover, the tension of the printing screen was a measured value of a bend amount (mm) by "a measuring unit STG-80D manufactured by Protech Co., Ltd.". Furthermore, the emulsion thickness of the printing screen was a value measured by "a contact type of thickness measuring machine".

In Example 4, the tension of the printing screen is low, the emulsion thickness is large, and hence the surface roughness of each electrode becomes small.

INDUSTRIAL APPLICABILITY

According to a manufacturing method of a honeycomb structure of the present invention, it is possible to prepare the honeycomb structure which can suitably be used as a catalyst carrier for an exhaust gas purification device to purify a car exhaust gas.

DESCRIPTION OF REFERENCE MARKS

1: partition wall, 2: cell, 3: outer peripheral wall, 4: honeycomb structure part, 5: side surface, 6: non-fired electrode, 7: center, 11: one end surface, 12: the other end surface, 21: electrode, 31: electrode paste, 32: plate, 32*a*: frame, 33: printing screen, 34: squeegee, 41 and 41*a*: end surface grip portion, 42: image pickup device, 51: wire, 52: opening area, 61: first measurement portion, 62: second measurement portion, 63: third measurement portion, 64: fourth measurement portion, 100: ceramic honeycomb formed body, 200: honeycomb formed body with non-fired electrodes, 300 and 400: honeycomb structure, O: center, α: center angle, θ: angle of 0.5 time of center angle, A: columnar body, B: concave (bend), D: wire diameter, J and K: direction, OP: opening, P: mesh pitch, and T: sheet thickness.

TABLE 1

| | Squeegee | | Printing screen | | Thickness of Electrode (μm) | | | |
|---|---|---|---|---|---|---|---|---|
| | Hardness (deg.) | Length (mm) | Tension (mm) | Emulsion thickness (μm) | 1st measurement point Axis: end Periphery: end | 2nd measurement portion Axis: center Periphery: end | 3rd measurement portion Axis: end Periphery: center | 4th measurement portion Axis: center Periphery: center |
| Example 2 | 60 | 200 | 0.8 | 20 | 100 | 110 | 90 | 110 |
| Example 3 | 60 | 110 | 0.9 | 20 | 100 | 100 | 100 | 100 |
| Example 4 | 60 | 110 | 1.8 | 40 | 105 | 105 | 105 | 110 |

| | Surface roughness of electrode (μm) | | | | |
|---|---|---|---|---|---|
| | 1st measurement point Axis: end Periphery: end | 2nd measurement portion Axis: center Periphery: end | 3rd measurement portion Axis: end Periphery: center | 4th measurement portion Axis: center Periphery: center | Evaluation |
| Example 2 | 8.16 | 6.56 | 9.06 | 7.24 | B |
| Example 3 | 6.63 | 5.97 | 5.23 | 6.37 | B |
| Example 4 | 3.35 | 3.81 | 3.51 | 3.91 | A |

As seen from Table 1, in Examples 3 and 4, the length of the squeegee is 5 mm smaller than the length (115 mm) of the ceramic honeycomb formed body in the central axis direction, and hence the thickness of each electrode of the obtained honeycomb structure is uniform. This is because when the ceramic honeycomb formed body is pressed by the squeegee, the ceramic honeycomb formed body can be pressed so that the squeegee does not come in contact with both ends (tip portions) of the ceramic honeycomb formed body. That is, since the squeegee does not come in contact with both the ends (the tip portions) of the ceramic honeycomb formed body, an influence of "the shape of the ceramic honeycomb formed body which is slightly recessed toward the center in the central axis direction" is not easily received. In contrast, in Example 2, the length of the squeegee is larger than the length (115 mm) of the ceramic honeycomb formed body in the central axis direction, and hence the thickness of each electrode of the obtained honeycomb structure slightly becomes large at the center thereof in the central axis direction.

What is claimed is:

1. A manufacturing method of a honeycomb structure comprising:

a forming step of a honeycomb formed body with non-fired electrodes where there is performed twice a non-fired electrode forming operation in which an electrode paste is attached to a plate including a printing screen, a side surface of a columnar ceramic honeycomb formed body, the side surface being a curved side surface, is brought into a pressed state by a squeegee via the printing screen of the plate, the ceramic honeycomb formed body including: partition walls to divide and form a plurality of cells which extend from one end surface to another end surface and become through channels of a fluid, the end surfaces respectively defining surfaces of tip portions of the ceramic honeycomb formed body; and an outer peripheral wall positioned in the outermost periphery of the body, in the state, the ceramic honeycomb formed body is rotated around a central axis and the plate is linearly moved along the side surface of the ceramic honeycomb formed body synchronously with the rotation of the ceramic honeycomb formed body, and the squeegee allows the electrode paste attached to the plate to permeate the printing screen and coat the side surface of the ceramic honeycomb formed body, to form a pair of non-fired electrodes on the side surface of the ceramic honeycomb formed body, thereby preparing the honeycomb formed body with the non-fired electrodes; and a forming step of the honeycomb structure where the honeycomb formed body with the pair of non-fired electrodes is fired, to obtain the honeycomb structure including a pair of fired electrodes on a side surface of the honeycomb structure, wherein the squeegee has a hardness of from 30 to 90 degrees, the printing screen has a tension of from 1.0 to 2.0 mm, and a pressure during the pressed state of the ceramic honeycomb formed body by the squeegee is from 0.05 to 0.4 MPa, and wherein a length of the squeegee in a longitudinal direction is at least 0.1 cm smaller than a length of the ceramic honeycomb formed body in a central axis direction, and at least 0.5 cm larger than a width of a printing pattern in the central axis direction, so that, during formation of the non-fired electrodes, the squeegee avoids contact with either tip portion of the ceramic honeycomb formed body through the printing screen.

2. The manufacturing method of the honeycomb structure according to claim 1, wherein a thickness of the printing screen of the plate is from 22 to 300 μm.

3. The manufacturing method of the honeycomb structure according to claim 2, wherein in the forming step of the honeycomb formed body with the non-fired electrodes, the honeycomb formed body with the non-fired electrodes is prepared so that in a cross section of the honeycomb formed body with the non-fired electrodes which is orthogonal to a cell extending direction, a direction in which centers of the non-fired electrodes in an outer peripheral direction of the ceramic honeycomb formed body are connected to each other matches a direction in which part of the partition walls extend, in a range of ±15°.

4. The manufacturing method of the honeycomb structure according to claim 1, wherein in the forming step of the honeycomb formed body with the non-fired electrodes, the honeycomb formed body with the non-fired electrodes is prepared so that in a cross section of the honeycomb formed body with the non-fired electrodes which is orthogonal to a cell extending direction, a direction in which centers of the non-fired electrodes in an outer peripheral direction of the ceramic honeycomb formed body are connected to each other matches a direction in which part of the partition walls extend, in a range of ±15°.

* * * * *